United States Patent [19]

Gregg

[11] Patent Number: 5,521,452

[45] Date of Patent: May 28, 1996

[54] SHOCK-RESISTANT, ELECTROSTATICALLY ACTUATED PICK-UP FOR OPTICAL RECORDING AND PLAYBACK

[75] Inventor: David P. Gregg, Culver City, Calif.

[73] Assignee: Discovision Associates, Irvine, Calif.

[21] Appl. No.: 333,107

[22] Filed: Nov. 1, 1994

Related U.S. Application Data

[62] Division of Ser. No. 13,773, Feb. 5, 1993.

[51] Int. Cl.$^6$ .................................................... H02N 1/08
[52] U.S. Cl. ............................................................. 310/309
[58] Field of Search ......................... 310/309; 369/44.1, 369/45; 350/252, 257

[56] References Cited

U.S. PATENT DOCUMENTS

| | | | |
|---|---|---|---|
| 2,113,184 | 4/1938 | Sperti | 179/100.3 |
| 2,975,307 | 3/1961 | Schroeder et al. | 310/309 |
| 3,530,258 | 9/1970 | Gregg et al. | 179/100.3 |
| 4,092,529 | 5/1978 | Aihara et al. | 250/201 |
| 4,252,412 | 2/1981 | Camerik | 350/255 |
| 4,269,486 | 5/1981 | Shintani | 350/486 |
| 4,302,830 | 11/1981 | Hamaoka et al. | 369/45 |
| 4,322,837 | 3/1982 | Mickleson et al. | 369/44 |
| 4,337,531 | 6/1982 | Willemsen | 369/45 |
| 4,342,935 | 8/1982 | Kallmeyer et al. | 310/328 |
| 4,367,543 | 1/1983 | Araki et al. | 369/45 |
| 4,488,789 | 12/1984 | Kenney | 350/255 |
| 4,672,594 | 6/1987 | Kato et al. | 369/13 |
| 4,794,581 | 12/1988 | Andresen | 369/45 |
| 4,807,213 | 2/1989 | Chung et al. | 369/46 |
| 4,822,139 | 4/1989 | Yoshizumi | 350/257 |
| 4,857,719 | 8/1989 | Ando | 250/201 |
| 4,927,235 | 5/1990 | Narumi | 350/252 |
| 4,939,711 | 7/1990 | Yoda | 369/13 |
| 4,942,562 | 7/1990 | Suzuki | 369/44.11 |
| 4,945,526 | 7/1990 | Jansen et al. | 369/44.11 |
| 4,945,527 | 7/1990 | Sunagawa | 369/44.11 |
| 4,945,529 | 7/1990 | Ono et al. | 369/109 |
| 4,948,230 | 8/1990 | Kashahara et al. | 350/255 |
| 5,084,645 | 1/1992 | Collins, Jr. et al. | 310/309 |
| 5,170,089 | 12/1992 | Fulton | 310/328 |
| 5,206,557 | 4/1993 | Bobbio | 310/309 |
| 5,375,033 | 12/1994 | MacDonald | 310/309 X |

FOREIGN PATENT DOCUMENTS

| | | |
|---|---|---|
| 1167550 | 4/1964 | Germany. |
| 1119926 | 5/1989 | Japan. |
| 1238470 | 9/1989 | Japan. |

OTHER PUBLICATIONS

NASA Technical Brief, NTIS Tech Notes, Jul. 1990, Springfield, VA, US p. 568, XP000149186, Collins et al "Electrostatic Linear Actuator".

IBM Technical Disclosure Bulletin, vol. 6, No. 4, Sep. 1963, p. 134, Jones "Electrostatic Device".

*Primary Examiner*—Mark O. Budd
*Attorney, Agent, or Firm*—Ronald J. Clark; Robert T. Braun; Arthur S. Bickel

[57] ABSTRACT

A pick-up device for optical recording and playback includes two linear actuators coupled to an optical module and lying in a plane normal to the surface of an optical recording medium. The actuators are obliquely inclined to the optical axis of the optical module. Proportional differential actuation of the linear actuators moves the optical module bi-axially, i.e., normal or parallel to the recording medium surface, permitting control of both focus and tracking of information bits on the surface. The preferred embodiment employs two bi-directional linear actuators, each comprising a pair of back-to-back uni-directional actuators, each of which includes a flexible tubular housing enclosing a stack of thin, perforated disc-shaped electrodes separated by a dielectric fluid. Conductive elastomeric spacer rods support the disks in a parallel, longitudinally, spaced apart arrangement. Applying a voltage to adjacent pairs of disks via the conductive elastomeric rods causes an electrostatic attraction force between adjacent disks to shorten the stack. Contraction of the stack housing causes an elongated actuator rod disposed longitudinally through the housing and attached to a transverse end cap sealing the housing at one end to be extended further from the opposite end cap of the housing, the free end of the rod thus being able to exert a pushing force.

21 Claims, 6 Drawing Sheets

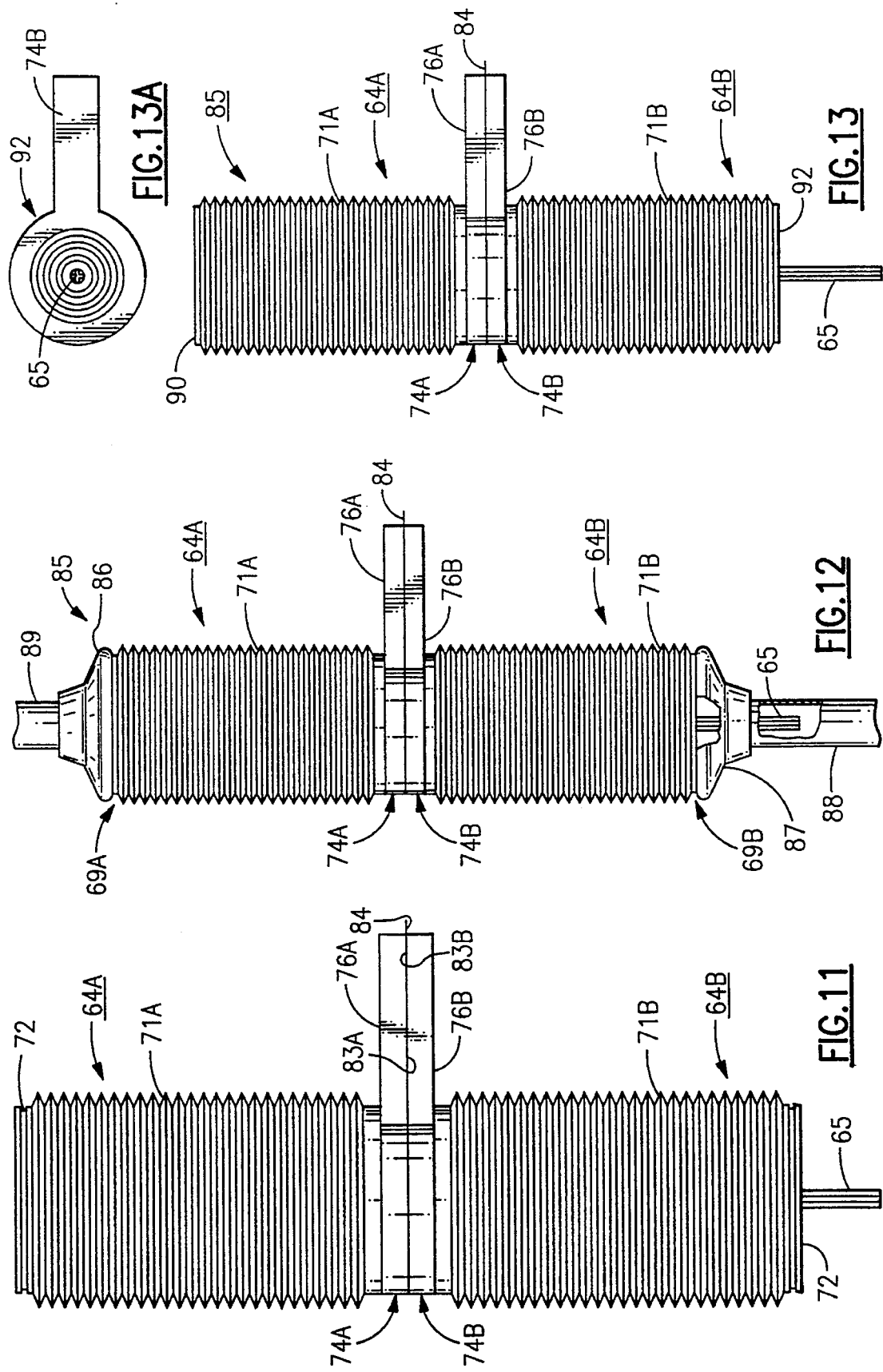

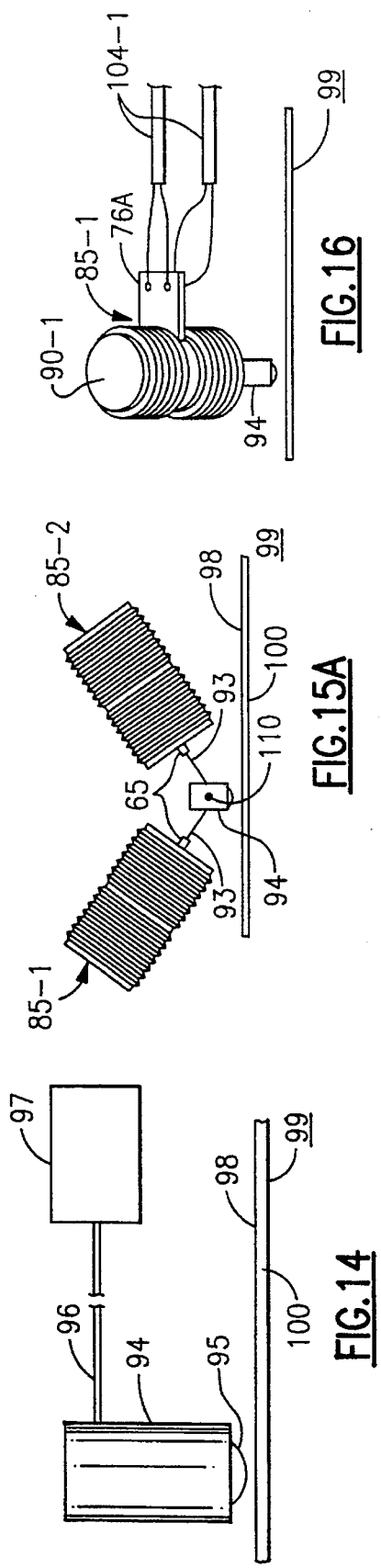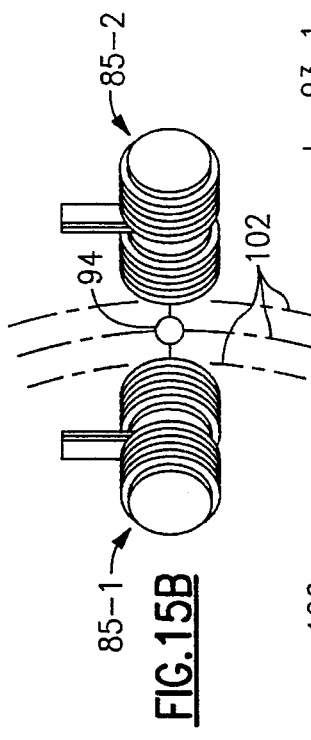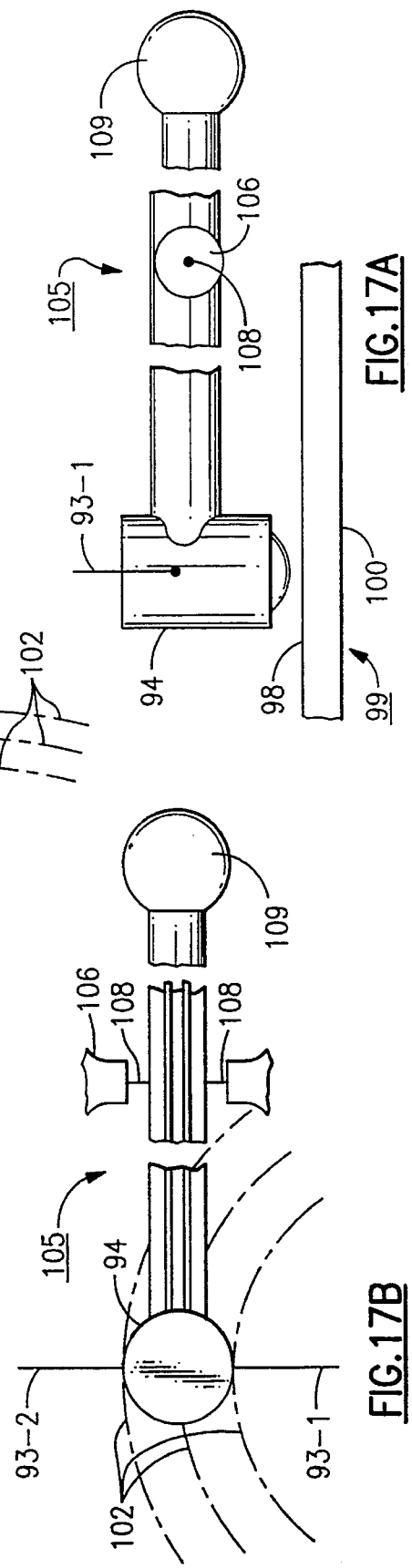

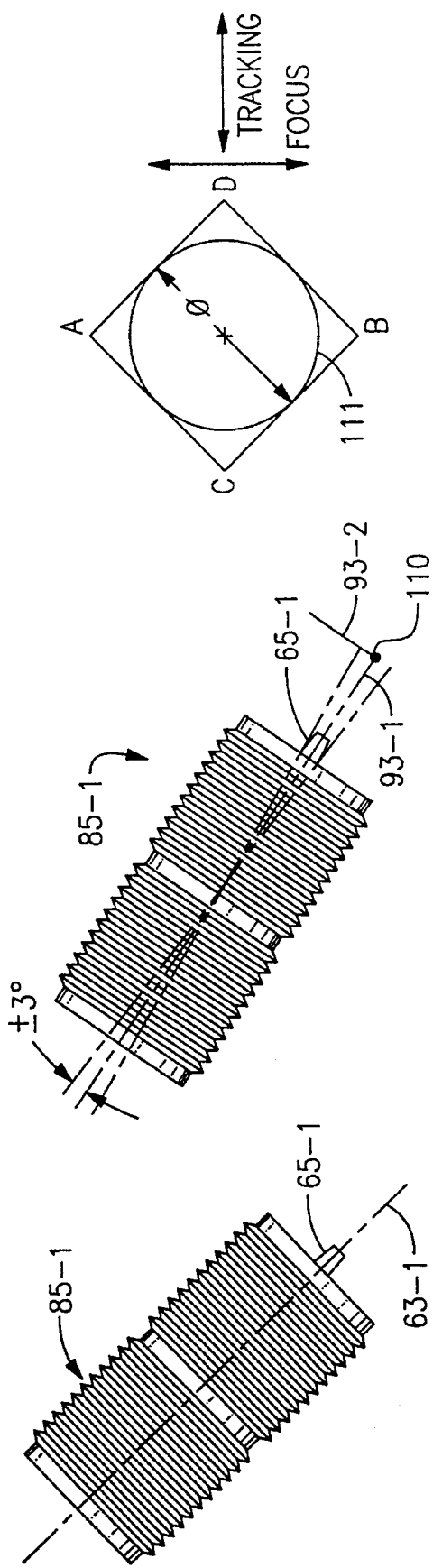
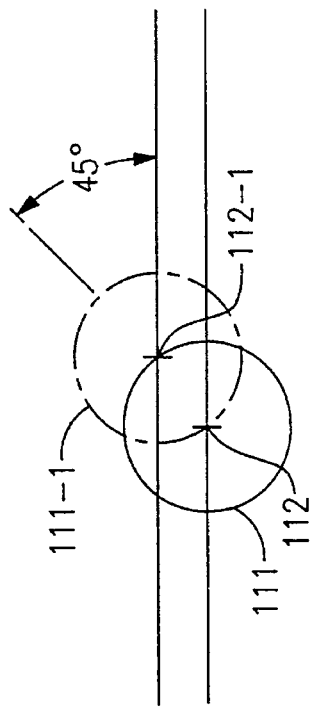
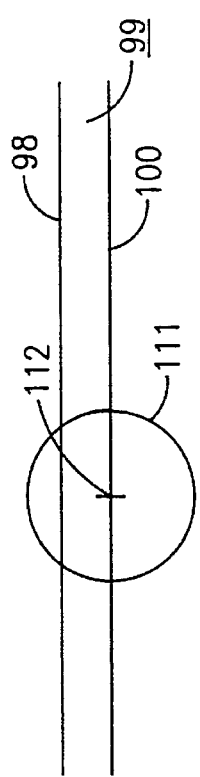
FIG.20
FIG.19
FIG.18
FIG.20B
FIG.20A

SHOCK-RESISTANT, ELECTROSTATICALLY ACTUATED PICK-UP FOR OPTICAL RECORDING AND PLAYBACK

This is a division of application Ser. No. 08/013,773 filed Feb. 5, 1993 pending.

BACKGROUND OF THE INVENTION

1. Field of the Invention

The present invention relates to the field of optical recording and reproduction of information on optical disks and similar optical information storage media. More particularly, the invention relates to an improved shock-resistant pick-up apparatus for directing radiant energy onto precisely controllable locations of an optically sensitive recording medium to record information on the medium, and/or to reproduce information previously recorded on the medium.

2. Description of Background Art

Optical storage of information on video disks has come into widespread use for a variety of applications. Video disks using pulse width modulated (PWM) and pulse code modulated (PCM) signals containing audio, video, alphanumeric information, as well as binary encoded data in general, are in common use. Video disk systems use an electro-optical device, usually called a pick-up, to focus on and track information-containing regions of the disk, in which information bits are recorded by altering an optical property of the disk. Individual bits of bi-directional information may be recorded in spaces having a maximum dimension of less than 1 micron. Typically, these regions are arranged in the form of a continuous spiral track, or a series of concentric tracks, containing a string of bits. Precise tracking is required to select a track, or to maintain a selected track, or portion of a track, within the optical field of view of the pick-up. Precise focusing is also required to recover closely packed information bits contained in a track.

Focusing and tracking of information bits are usually performed by a servomechanism which moves the objective lens of an optical pick-up apparatus. Normal motion of the pick-up with respect to the information-bearing surface of the rotating disk performs focusing, while radial motion of the pick-up performs tracking. Motion required for focusing on the information bearing surface of the video disk typically is achieved by enclosing the lens in a relatively co-planar ring. The ring is wound with an electrical coil, which in turn is mounted flexibly within a concentric circular magnet. The coil and magnet combination resembles the voice coil and magnet arrangement found in common audio loudspeakers. Optical energy focused by the lens onto a photodetector permits closed-loop servo control of the relative distance between lens and disk.

Tracking of information tracks on a rotating video disk is typically accomplished by mounting one or more electrical tracking coils onto the voice coil ring, radially distant from but normal to the longitudinal axis of the pick-up. When electrically energized, the tracking coils are attracted angularly about the axis of the pick-up relative to poles provided within the concentric permanent magnet enclosing the voice coil. Now, the optical axis of the objective lens is fixed eccentrically from and parallel to the longitudinal axis of the pick-up. Therefore, when the voice coil ring is rotated bi-directionally about the pick-up axis, the optical axis of the lens moves bi-directionally in a radial arc lying in a plane parallel to the information-bearing surface of the disk. For small arc lengths, this bi-directional motion is substantially along a radius of the disk.

Usually, a movable mechanical support device or transport is used to position the pick-up at a desired approximate position relative to a disk. The pick-up is held and moved radially across the rotating video disk during play by a servo-mechanism that controls the transport which, for example, may be of the radial guided rail type or the swing arm type, both derived from the phonograph record player art.

Phonograph record players are sensitive to external disturbances and often skip grooves as a result of such disturbances. Similarly, video disk players may respond to shakes and bumping by skipping turns of an optical information track, and/or by defocusing. Track skipping and defocusing in video disk players occur because the dynamic tracking range of existing electro-optical pick-ups is limited by existing designs to a relatively small number of turns of the optical track. Although the transport mechanism is controlled by a servo mechanism to maintain the position of the pick-up near the center of its dynamic range, the inertia of the pick-up and the transport in combination, during the presence of shaking or bumping, may require tracking maintenance forces beyond the system capabilities.

Several technologies are currently used to minimize the effect of video disk track skipping resulting from shock or vibration. Loss of focusing under such conditions is not compensated for in most currently existing systems. In video disk systems adapted to accommodate disks of various diameters and designed for portability, installation in automobiles, and the like, shock mounting or cushioning is used to minimize the effects of shock and vibration. However, such cushioning may not adequately isolate the systems from unusually large accelerations. Video disk systems used in stationary installations, such as studios or homes, sometimes employ a combination of massive construction and cushioned mounting of the apparatus in order to reduce the effects of minor shaking.

Another system for reducing optical track-skipping during accelerations caused by shock or vibration utilizes electronic circuitry to delay and continuously store the information stream from a limited number of turns of the disk in an electronic memory device, of the clocked First-In-First-Out (FIFO) type. During accelerations which cause skipping, information is outputted without interruption from the FIFO at the clock rate while the pick-up is restored to the point in that optical track where skipping began. The period during which this restoration occurs is compensated for by a temporary acceleration in disk rotational speed.

Taking into account the relatively heavy masses of the permanent magnet, focusing and tracking windings, objective lens and related elements of a typical pick-up, and its rigid transport mechanism in the video disk player, efforts are being made to reduce the masses of the pick-up and transport, thereby achieving some reduction in susceptibility to vibration, bumping and shocks. Integrating the optics and laser within a single solid state device of relatively small size is one approach being used to achieve the desired mass reduction. This approach is described in "Integrated-Optic Disc Pick-Ups," Nishihara et al., Optical Data Storage, v. 1663, p. 26, SPIE-Intl. Soc. Opt. Engrg., 1992.

In video disk player apparatus, the locational tolerances relating the axis of the turntable motor, the pick-up transporting means, and the optical axis of the pick-up, all require a high degree of precision in the manufacture of the component parts and in the assembly and test of the finished product. Means are provided by my invention to loosen such locational tolerances, reduce the need for precision, and simplify the assembly and test of video disk apparatus.

The present inventor is aware of the following U.S. Patents which may have possible relevance to the present invention:

| U.S. Pat. No. | Inventor | Issue Date |
| --- | --- | --- |
| 2,113,184 | Sperti | 04/04/38 |
| 3,530,258 | Gregg | 09/22/68 |
| 4,092,529 | Aihara, et al. | 05/30/78 |
| 4,252,412 | Camerik | 02/24/81 |
| 4,269,486 | Shintani | 05/26/81 |
| 4,302,830 | Hamaoka, et al. | 12/24/81 |
| 4,322,837 | Mickleson, et al. | 03/30/82 |
| 4,337,531 | Willemsen | 06/29/82 |
| 4,342,935 | Kallmeyer, et al. | 08/03/82 |
| 4,367,543 | Araki, et al. | 01/04/83 |
| 4,488,789 | Kenney | 12/18/84 |
| 4,672,594 | Kato, et al. | 06/09/87 |
| 4,794,581 | Andresen | 12/27/88 |
| 4,807,213 | Chung, et al. | 02/21/89 |
| 4,822,139 | Yoshizumi | 04/18/89 |
| 4,857,719 | Ando | 08/15/89 |
| 4,927,235 | Narumi | 05/22/90 |
| 4,939,711 | Yoda | 07/03/90 |
| 4,942,562 | Suzuki | 07/17/90 |
| 4,945,526 | Jansen, et al. | 07/31/90 |
| 4,945,527 | Sunagawa | 07/31/90 |
| 4,945,529 | Ono, et al. | 07/31/90 |
| 4,948,230 | Kasahara, et al. | 08/14/90 |

All relevant prior art that the present inventor is aware of disclose the use of conventional electromagnetic or piezoelectric devices to effect focusing and/or tracking of an optical beam on an optical recording medium. Devices of this type have inherent drawbacks such as limited frequency response, limited deflection range, excessive weight or cross-axis coupling.

None of the prior art which the present inventor is aware of provides a completely satisfactory solution to the problem of accurately controlling the tracking and focus of pick-up heads used in optical recording. The present invention was conceived to provide an improved pick-up apparatus for optical recording that employs electrostatic forces and overcomes certain limitations of prior art pick-up devices.

OBJECTS OF THE INVENTION

An object of the present invention is to provide an apparatus for controlling the position of an optical beam incident upon the surface of an information storage medium.

Another object of the invention is to provide an electrostatically deflected transducer apparatus for controlling the position of an optical focusing means relative to a surface.

Another object of the invention is to provide an electrostatically deflected apparatus for controlling the position of an optical focusing means relative to the surface of an information storage medium, and for conveying optical energy between the medium and a remote optical transducer.

Another object of the invention is to provide an electrostatic deflection apparatus adapted to deflecting an optical focusing means to a precisely controllable position along the optical axis of the focusing means, i.e., along the Z axis, normal to the surface of an information storage medium.

Another object of the invention is to provide an electrostatic deflection apparatus for an optical record/read pick-up head which is adapted to moving the optical axis of the focusing means in an X-Y tracking plane, i.e., parallel to the surface of an information storage medium.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved pick-up apparatus for use in optically recording and reproducing information on optically sensitive media. The improved pick-up apparatus, according to the present invention, is usable with a variety of controlled transporting means. These include, among others, the swinging arm type and the guided radial type used with video disks.

The optical pick-up device, according to the present invention, is adapted to be fixed to a transporting means. The pick-up includes a novel actuator mechanism which is mechanically coupled to an optical module or capsule having an optical system adapted to convey radiant energy to, or receive reflected energy from, a precisely determinable position on the information-bearing surface of an optical disk.

The novel actuator mechanism according to the present invention includes one and preferably two actuators. Each actuator according to the present invention includes an elongated, resilient cylindrical tube filled with a dielectric fluid and containing a longitudinally disposed stack of cylindrical capacitive cells. Each capacitive cell is adapted to decrease its axial thickness dimension and, therefore, the length of the tube, when a voltage difference is applied between each pair of perforated, conductive circular wafers comprising the electrodes of each capacitive cell. Motion of the capacitive cells is coupled to an external object to be moved, such as an optical module, by means of an actuator rod which protrudes coaxially through central coaxial holes in the wafers, and out through one end of the stack. To provide bi-directional, or push-pull actuating force capability, two stacks operated by separate voltage sources are coupled end-to-end. In the preferred embodiment, two bi-directional actuator assemblies oriented perpendicularly to one another and lying in a vertical plane are coupled at 45 degree angles relative to the vertically oriented axis of an optical module, thus providing vertical focusing motion and horizontal tracking motion of the module.

The optical system of the capsule includes a glass or molded plastic spherical or aspherical objective lens, or one or more optical fibers. Alternatively, a diffraction grating of equivalent optical properties may be used. In either case, the optical axis of the optical system is held continuously normal to and dynamically in focus with the optical information-bearing surface of an optical disk, by operation of the novel actuators. Information-bearing signals reflected from the disk are conveyed to remote optical and electronic processing means, preferably by an optical fiber.

The dynamic optical tracking function of the capsule may accommodate a beam splitter in the optical path to the information bearing surface, reflected energy from which is also conveyed to remote optical and electronic processing means.

In one embodiment of the invention, information-bearing optical signals are transmitted to and received from the optical capsule of the pick-up device by means of two or more optical fibers. Ends of the optical fibers remote from the capsule are connected to a combination of optical and electronic elements, comprising a quarter wave plate, diffraction grating, beam splitter, quadrature detecting photodiode, collimator, coherent light source, electrical conductors and the like, of the types that are used in conventional video disk recording and playback apparatus.

The low mass of the novel pick-up device according to the present invention affords very fast response of the pick-up, and resistance to shock, vibration and bumping, without loss of tracking and focusing.

The low mass also permits the transport, which holds the pick-up, to be of lower mass. Therefore, the novel features of the pick-up according to the present invention offer much faster access to any desired point on the video disk than the best magnetic pick-ups.

BRIEF DESCRIPTION OF THE DRAWINGS

FIG. 11 is a side elevation view showing the blind wafer stack of FIG. 10 joined to a second, identical, inverted blind wafer stack, to form an actuator.

FIG. 12 is a side elevation view illustrating the manner of filling the actuator of FIG. 11 with liquid dielectric.

FIG. 13 is a side elevation view of a completed actuator of the type shown in FIG. 12.

FIG. 13A is a bottom plan view of the actuator of FIG. 13.

FIG. 14 is a side elevation view of an optical module and associated optical components used in the pick-up apparatus of the present invention.

FIG. 15A is a fragmentary front elevation view of a pick-up apparatus according to the present invention which uses two actuators of the type shown in FIG. 13 and the optical module and associated components of FIG. 14.

FIG. 15B is an upper plan view of the structure of FIG. 15A.

FIG. 16 is a fragmentary side elevation view of the apparatus of FIG. 15.

FIG. 17A is a side elevation view of a drag link beam apparatus used to support an optical module used in the apparatus of FIG. 15.

FIG. 17B is an upper plan view of the apparatus of FIG. 17A.

FIG. 18 is a diagrammatic view showing longitudinal travel of one actuator of the apparatus of FIG. 15.

FIG. 19 is a diagrammatic view similar to that of FIG. 18, but showing the coupled motion of two actuators.

FIG. 20 is a schematic view showing the performance envelope of the pick-up apparatus of FIG. 15.

FIG. 20A is a schematic view showing the performance envelope of FIG. 20 centered on a tracking point of a video disk.

FIG. 20B is a view similar to that of FIG. 20A, but showing the performance envelope displaced from the tracking point.

DETAILED DESCRIPTION OF THE INVENTION

Figure 1:
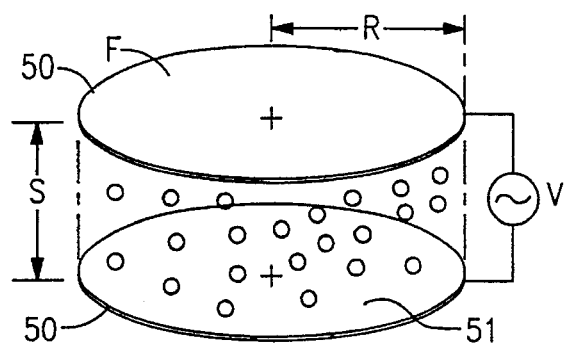
FIG. 1 is a schematic view of a pair of electrostatically charged disks or wafers used in an actuator of the present invention.

An understanding of the novel structure and function of the pick-up device according to the present invention may be facilitated by perusing the description given below of fabrication steps which may be used in the manufacture of the device, along with an analysis of operation of the device.

A. Design Assumptions

The pick-up device according to the present invention is intended for use with a servo controlled transport which supports the pick-up. Shock, vibration and bumping conditions which might otherwise cause a temporary loss of the tracking and focussing are compensated for by the low mass, fast-response pick-up device according to the present invention. The novel pick-up device according to the present invention can respond to closed-loop error correction requirements with much higher accelerations than can the transport device which supports the pick-up, the disk or any other components of the video disk system.

The novel actuator mechanism of the pick-up according to the present invention eliminates wound coils and costly and heavy permanent magnets. Instead, electrostatic attractive forces between elements of a novel capacitive force producing device are used. The materials are of very low cost and well suited to automated manufacturing.

Although electronic servo control circuits are not described in this disclosure, those skilled in the art will recognize that the high speed capacitive actuators of the pick-up may be easier to energize than inductive magnetic pick-ups now used. Furthermore, the actuators of the low mass, fast response pick-up may be driven by pulse circuitry rather than by linear circuitry.

The example embodiment of the novel pick-up described herein compensates over a range of 1.5 mm in tracking, equivalent to more than 900 turns at 1.6 μm pitch. Over that range, the pick-up design also simultaneously maintains focusing during shocks and bumping. Focus control may also have a sufficient dynamic range to prevent damaging contact during play between the video disk and the optical elements of the capsule.

An understanding of an example pick-up according to the present invention given below may be facilitated by reference to the manufacturing steps that may be used in its fabrication. These steps include:

Forming disks into wafers

Adding wafers into stacks

Combining stacks into two actuators

Assembling two actuators into pick-up

Adding an optical module (called capsule here) into pick-up

Attaching pick-up to low mass transport

Combining transport with remote optoelectronics.

It is to be understood that the order of steps is for illustration purposes, and would not necessarily be adhered to in actual manufacturing operations.

1. Stack

The novel actuators used in the pick-up apparatus according to the present invention include longitudinally disposed stacks of thin, perforated, parallel conductive disks or wafers of small diameter. The disks are spaced apart at equal longitudinal intervals, and are immersed in a liquid dielectric. Alternate disks are electrically connected to a variable voltage source to develop a controlled voltage difference between the discs. In the example embodiment, there are 31 collinear wafers in each stack, providing 30 active pairs or capacitive cells. To provide a bi-directional or push-pull force-exerting capability, two collinear stacks are joined end-to-end in each actuator. In the preferred embodiment, two independent, obliquely disposed actuators are used in each pick-up, to provide a two-axis deflection capability.

An electrostatic attractive force is developed between each pair of adjacent wafers of each cell in the stack when an electrical potential is applied between that pair of members. The tensional force created by the stack may be determined by analyzing the force produced by a single pair of adjacent disks. Additional cells merely contribute to the length of the stroke of the actuator.

2. Force Calculation

Referring now to FIG. 1, it may be shown that the attractive force between a pair of circular disks 50 having an electrical potential difference is:

$$F = \frac{1}{2} \epsilon_o KA \left(\frac{V}{S}\right)^2$$

Where

F=force (newton)

$\epsilon_o$=permittivity ($8.85 \times 10^{-12}$ farad/meter)

K=dielectric constant (dimensionless)

A=area (meter$^2$)

V=potential difference (volts)

S=spacing between disk surfaces (meter).

The dielectric constant of a dielectric fluid 51 between wafers 50 is taken as 50 (as explained below). The radius of each wafer in the example embodiment is 6.35 mm (¼ inch), giving an area A=$6.35^2 \pi$=1.267 cm$^2$. For a spacing between adjacent wafers of 50 μm, the voltage necessary to produce a peak attractive force of 1.0 newton is about 300 volts. For spacings of 25 and 75 μm, the voltages are 150 and 450 volts, respectively. These voltages occur only in response to large disturbances of the pick-up and last in the order of a millisecond.

Quiescent or bias voltages between wafer pair members 50 of a cell 63 would be of the order of ten to twenty volts. Normal operating voltages in an operating video disk player should not exceed 100 volts.

As stated above, in the example embodiment, the nominal disk spacing between wafers 50 of a cell pair is 50 μm, with excursions to 25 and 75 μm, requiring transient voltages of 300, 150 and 450, respectively. Thus, thirty active pairs in a stack provide a working motion or stroke of (30)×(75–25 μm)=1.5 mm. At any position within this working range, there will be available a peak force of 1 newton to provide closed-loop optical path tracking during shock and bumping conditions.

The distance and voltage relationships given here are discussed further in the description of the operation of the complete actuator.

A single stack can exert only an attractive, or stack-shortening action. Therefore, for bi-directional or push-pull operation, two opposed stacks are used in each actuator.

3. Acceleration

The mass of the 62 wafers used in the example stack is approximately 0.2 grams, if the disks are made of aluminum, but less if a conductive plastic material is used. If other elements of the actuator increase the mass to one (1) gram, then the peak acceleration of the actuator output by itself, will be a=F/m≅1 newton/0.001 kilogram–1,000 meters per second$^2$, which is some 100 times the acceleration of gravity.

The above calculation is based on simplified assumptions, and probably errs on the side of conservatism. In actuality, within a stack, the proximal end of the stack is fixed to the transport, and the first wafer in a stack will remain stationary, while only the opposite end and last wafer move the full 1.5 mm. For example, the second wafer from the moving end will move (30/31)(1.5) mm, the next (29/31)(1.5) mm, and so on, in decrements to zero.

Acceleration of cell members will be decreased in proportion to the hydraulic impedance of the flow of liquid dielectric through the wafers in the stack; but the resistive component of this impedance results in desirable viscous damping. The mass of the optical elements of the pick-up to which the actuator is coupled also will reduce the acceleration. As explained below, attention is paid to the reduction of the mass of the optical elements.

4. Capacitance

An advantage of the capacitive actuator according to the present invention is the absence of inductive delay inherent in magnetically operated focussing and tracking pick-ups.

At the time t=0, if the actuator is at a nominal 50 μm wafer spacing, the capacitance of a stack of 30 wafer pairs is:

$$C = N \epsilon_o KA/S$$

Where

C=capacitance, farads
N=number of active wafer spaces, or cells
$\epsilon_o$=permittivity, farads/meter
K=dielectric constant, dimensionless
A=effective wafer area, meter$^2$
S=wafer spacing, meters For a nominal spacing of 50 μm between cell members, $C=(30)(8.85\times10^{-12})(50)(1.267\times10^{-4})/(50\times10^{-6})=33.6$ nF. Similarly, at a cell spacing of 25 μm and 150 volts, C=67.2 nf, and at 75 μm and 450 volts, C=22.4 nf.

5. Capacitor Charge Transfer

For any of the three values of wafer pair spacing listed above, and at all spacings in between, a charge Q=cV is developed on the active stack of the actuator. In the design example given here, the product of capacitance and voltage remains the same: $1.18\times10^{-5}$ coulomb.

The servo control circuitry used to drive the actuator must be able to supply and receive the indicated charge.

6. Dielectric

Since the force developed by the actuator is directly proportional to the dielectric constant, K, everything else being held constant, a liquid dielectric of the highest K should be used, provided that its other qualifications are useable.

Possible liquid dielectrics are:

| Liquid | Dielectric constant, K |
|---|---|
| Glycerol | 42.5 |
| Ethylene Glycol | 37 |
| Methanol | 32.6 |
| 1,3-Propanesulfone | 86.3 |
| N-Ethylformamide | 102.7 |
| Tetrahydrothiophenedioxide | 46.8 |
| N-(2-Hydroxyethyl) acetamide | 96.6 |

A suitable candidate liquid dielectric must have the following characteristics: (1) high dielectric constant K; (2) fairly low viscosity; (3) sufficiently high dielectric strength (breakdown voltage); (4) chemical compatibility with other elements of the design; (5) high resistivity, and (6) freedom from gaseous generation.

7. Dielectric Strength

The breakdown voltage of the dielectric chosen should lie well within the requirements of the stack design. At the three wafer spacings of 25, 50 and 75 μm, the nominal peak voltages are 150, 300 and 450 respectively, producing equal field gradients of about 70 kv/cm for periods in the order of one millisecond, during which the accumulated charge, hence stored energy, is small. This energy is dissipated in the acceleration of the stack wafers.

It should be understood that the 450-volt peak transient voltage of volts 450 occurs only when the actuator is already at one extreme position, say −0.75 mm, and must instantly deflect to the other extreme, +0.75 mm, for the maximum excursion at the peak force of 1 newton.

8. Flow of Liquid Dielectric

Figure 2:
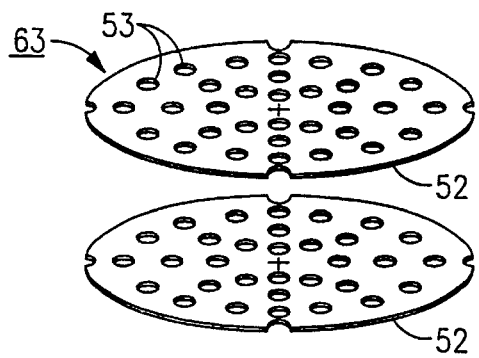
FIG. 2 is a fragmentary perspective view of a capacitive cell used in an actuator of the present invention.

Referring now to FIG. 2, because of the close spacing of wafers 52 used in the actuator of the present invention, each wafer is perforated by a plurality of circular holes 53 to permit easy flow of liquid dielectric through the wafers normal to their planes, whenever the spacing varies. The area and number of perforations is determined by the viscosity of the liquid dielectric and the degree of viscous actuator damping desired.

As shown in FIG. 2, the radius of wafers 52 is increased slightly to compensate for the loss of area occupied by holes 53. Thus, for purposes of calculation, the effective area of the wafer remains 1.27 cm$^2$.

9. Wafer Design

Wafers 52 may be of poor conductivity and should be of low chemical activity. The material chosen for the example embodiment is aluminum foil of 99.997% purity, 0.1 mm thick, available through Aesar/Johnson Matthey, Ward Hill, Mass. 01835. A plastic might be superior in stiffness, but would be formed, not by etching, but by punching, for example, followed by application of a thin conductive coating. In operation, wafers 52 never touch each other.

Figure 3:
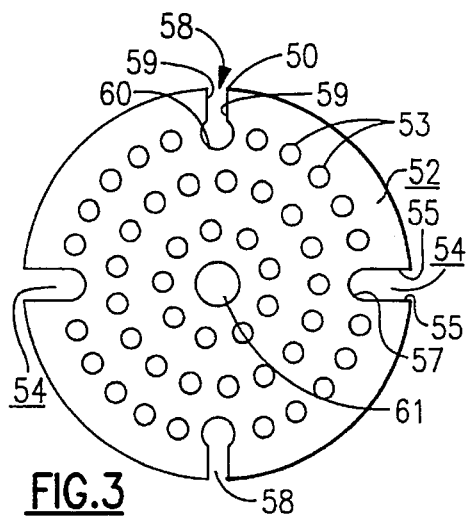
FIG. 3 is an upper plan view of a wafer used in the cell of FIG. 2.

FIG. 3 is a plan view of a wafer 52 used in the cell 63 of FIG. 2. As shown in FIG. 3, a first pair of "clearance" slots 54 having sides 55 parallel to and equidistant from a diameter of wafer 52 extends inwardly from diametrically opposed sides of the perimeter 56 of the wafer. Each slot 54 has a transverse inner end wall 57, which is preferably concavely shaped.

Also formed in wafer 52 is a second pair of diametrically opposed "pinch" slots 58 that extend inward from perimeter 56 of the wafer, centered on a diameter rotated ninety degrees from that of slots 54. Slots 58 also have parallel side walls 59 parallel to and equidistant from a diameter of wafer 52.

The width of pinch slots 58 is less than the width of clearance slots 54. Also, the inner end wall 60 of each slot 58 has an arcuate shape, forming an enlarged truncated circular opening having a larger diameter than the width of the slot. Each wafer 52 has through its thickness dimension a central coaxial perforation or hole 61 of larger diameter than perforations 53. The purposes of slots 54 and 58, and central hole 61, are described below.

Wafers having the described shape may be manufactured by punching from thin sheet stock. This fabrication method leaves burrs, which are preferably removed by reverse plating. In large volume production, wafers 52 may be manufactured continuously from aluminum foil by the photoresist and etch method. In either case, wafers 52 are preferably lightly anodized and boiled in water to seal the surfaces.

10. Wafer Pair and Stacking

Figure 4:
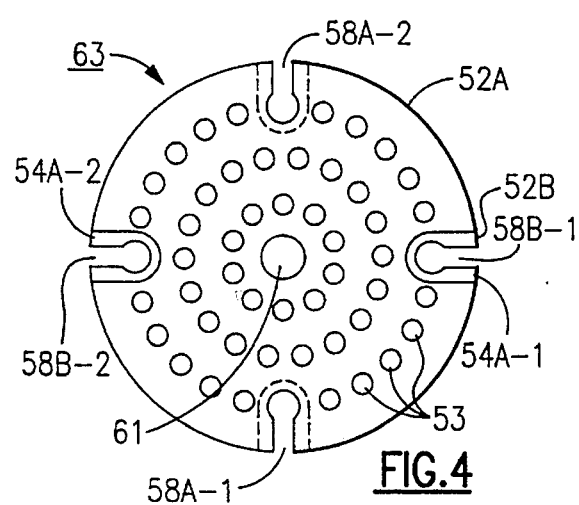
FIG. 4 is an upper plan view of a pair of wafers of the type shown in FIG. 3, one of which has been rotated ninety degrees.
Figure 6:
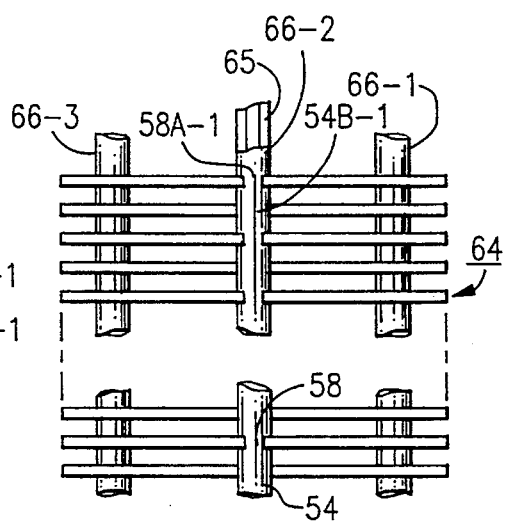
FIG. 6 is a broken elevation view of the structure of FIG. 5.

FIG. 4 shows a pair of wafers 52A and 52B, one of which is rotated 90° with respect to the other, to form a capacitive cell 63. To fabricate an actuator, 29 more wafers 52 are added for a total of 31. This construction results in 30 cells 63 disposed end-to-end, in a stack 64, as shown in FIG. 6.

The length of stack 64 at the maximum spacing between wafers 52 of 75 μm, is (31 wafers)(0.1 mm thick)+(30 spaces) (0.75 mm spacing)=5.35 mm. The nominal length of stack 64 is 4.6 mm, and its minimum length, 3.85 mm. The working stroke of actuator is nominally (5.35–3.85)=1.5 mm.

Figure 5:
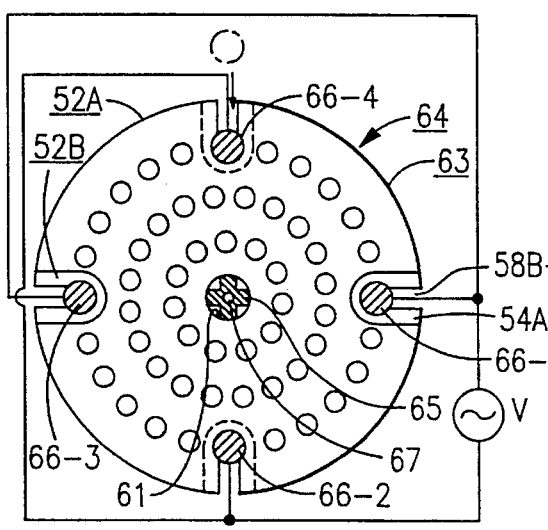
FIG. 5 is a plan view similar to FIG. 4, but showing spacer rods and a centering rod being integrated with wafers to form a stack.

Longitudinal alignment of stack 64 is preferably maintained by means of a slip-fit, insulating centering/actuator rod 65 disposed through central holes 61 of wafers 52, as shown in FIG. 5. As will be described later, rod 65 also serves as the means of coupling the force produced by stack 64 to external objects.

Rotational alignment of wafers 52 in stack 64 is preferably maintained by four conductive spacer rods 66, spaced 90° apart, as shown in FIG. 5.

As shown in FIG. 11, two wafer stacks 64 are used in each actuator 85; one stack called a "blind" stack 64A and a second stack called a "coupling" stack 64B are connected to an optical module or capsule, as will be described below.

11. Wafer Spacing in Stack a. Centering Rod.

Referring to FIG. 5, insulated centering/actuator rod 65 is inserted through center holes 61 in equally spaced alternate odd and even wafers 52A and 52B. In each stack 64, there is a total of 16 odd and 15 even wafers 52A and 52B, respectively. Rod 65 is preferably cut from an extrusion.

Centering/actuator rod 65 may have a cruciform cross-sectional shape, which provides spaces adjacent the inner annular wall of central perforation 61 in wafers 52 to facilitate flow of dielectric fluid through stack 64. A longitudinally disposed hole 67 is provided in centering/actuator rod 65 to receive a wire for coupling motion of rod 65 to an optical capsule, as will be described in detail below.

The length of centering/actuator rod 65 is determined by the method of its attachment to the optical capsule. In the preferred embodiment, rod 65 is fixed to the end cap of blind wafer stack 64A, protrudes through that stack, the electrical connecting and mounting means, and thence through coupling stack 64B, as shown in FIG. 11.

b. Spacer Rods.

FIG. 5 shows a longitudinally disposed spacer rod 66-4 in the process of being inserted into a longitudinally disposed row of 16 pinch slots 58 in wafers 52. Rods 66-1, 66-2 and 66-3 are shown already mounted.

Rods 66 are preferably made of a conductive elastomer, such as silicone rubber or other soft and highly compliant elastomer, loaded with carbon black, or other electrically conductive material. The material from which rods 66 are made must be sufficiently compliant in a longitudinal direction to compress readily when wafers 52 are electrostatically attracted to one another. Wafer 52A and all other alternate, even numbered wafers, for a total of 16, are mechanically and conductively connected by spacing rods 66-1 and 66-3. Similarly, wafer 52B and all other alternate, odd numbered, wafers, for a total of 15, are mechanically and conductively connected to spacer rods 66-2 and 66-4.

The radius of spacer rods 66 is slightly larger than the radius of the inner end wall 60 of both pinched radial slots 58 in each wafer 52. This interference fit of rod 66 in slot 58 has the effect of pinching the rubber rod slightly, so that the wafers may not shift in any direction relative to the rods after assembly.

c. Sacrificial Washers.

Figure 7A:
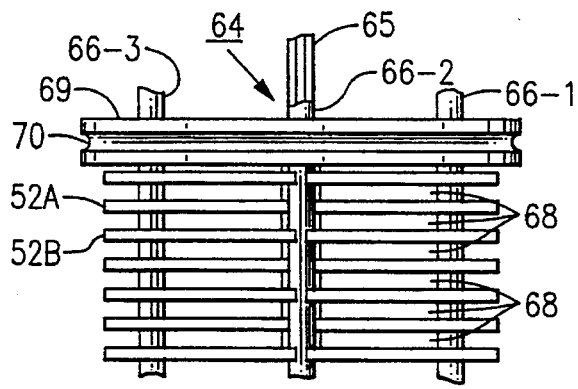
FIG. 7A is a fragmentary view similar to FIG. 6, showing an end cap fastened to the structure of FIG. 6.

FIG. 7A is a broken side view of a stack 64 of 31 odd numbered wafers 52A-1 through 52A-31, and even numbered wafers 52B-22 through 52B-30. Interleaved between each adjacent pair of wafers 52 is a "sacrificial" spacer washer 68. A total of 30 washers 68 are required. Spacer washers 68 may be punched from a low compliance, open celled, thin, sheet sponge material. If silicone spacer rods are used, then an open-cell acrylic-like foam material may be used.

The thickness of sacrificial washers 68 is about 200 μm in the example embodiment.

d. End Caps.

In FIG. 7A, each of two end caps 69 (only one is shown), nominally 1.5 mm thick, is bonded to an end wafer at both ends of the stack.

Figure 7B:
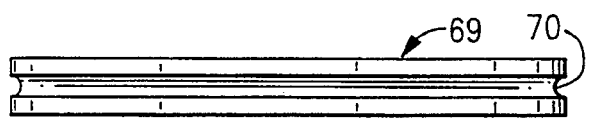
FIG. 7B is an enlarged elevation view of the end cap shown in FIG. 7A.

The faying surface of end cap 69 has a hole pattern identical to the hole pattern in wafers 52 to permit the flow of liquid dielectric through the end cap. End cap 69 also has an annular groove 70 around its perimeter for ease in gripping and bonding the collar end of actuator housing 71, as shown in FIG. 7B.

End caps 69 may be strung along the conductive spacer rods 66 before this step, since the spacer rods are assembled by pressing them into radial slots 58 in wafers 52.

Conductive spacer rods 66 are then bonded to end cap 69 at one end of stack 64. Silicone adhesive or the like is used for this purpose.

e. Tensioning the Spacer Rods.

Simply pushing conductive spacer rods 66, in their relaxed condition, into wafer pinch slots 58 does not guarantee that wafers 52 will be accurately spaced after assembly, nor that the various spacings during actuator contraction will be accurately smaller in proportion to control signals. One method to improve spacing is as follows.

The normal, relaxed spacing of wafers 52 being 75 μm between wafer surfaces, sacrificial spacers 68 (FIG. 6) may be made substantially thicker than 50 μm, say 200 μm. In this case, the stack is artificially lengthened from the working maximum 4.6 mm to:

$$(31)(0.1)+(30)(0.2)=9.1 \text{ mm}$$

With stack 64 firmly compressed and held in a processing tool, and conductive spacer rods 66 already pressed into position and bonded to end cap 69 of the stack, the four spacer rods are gripped and stretched such that their diameters are reduced, and then re-seated in slots 58 of the wafers. Thereupon, rods 66 are slackened to the point that their lengths within the stack are equivalent to 9.1 mm; they are then bonded to end cap 69 and clipped flush.

The foregoing procedure helps to insure that the tension within the spacer rods is accurately distributed throughout wafer stack 64. Spacer rods 66 are accurately located with respect to the wafers, as a result of being pinched within slots 58 in wafers 52.

e. Developing Final Stack Length.

While still held in the processing tool, and with centering/actuator rod 65 removed, stack 64 is submerged in an ultrasonic cleaning tank, preferably under a partial vacuum. The solvent in the tank may be a ketone, mono- or polyhydric alcohol, or the equivalent. In the case of the materials named for this example, this solvent will rapidly and selectively dissolve the porous acrylic sacrificial washers 68 while leaving wafers 52, silicone spacer rods 66, stack housing 71 and bonding intact. A rinse in an ultrasonic tank containing clean water, followed by drying in clean air, is employed to remove any residual solvent. "Blind" stack 64A has a centering/actuator rod 65 installed in the stack, and bonded to its end cap 69. A "coupling" stack 64B does not have a centering/actuator rod 65 installed during this procedure.

When stack 64 is released from the holding tool, wafers 52 are nominally spaced 50 μm apart.

12. Actuator Housing

Figure 8:
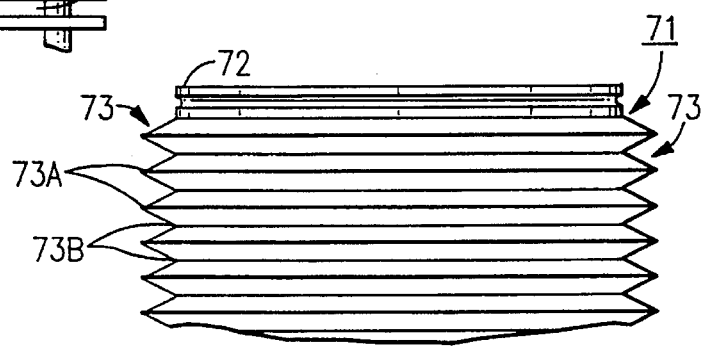
FIG. 8 is a fragmentary elevation view of a resilient housing forming part of the apparatus of FIG. 6.

Referring to FIG. 8 (only one end is shown), a housing 71 for stack 64 is shown to comprise a section of thin wall plastic tubing having a collar 72 and a plurality of annular corrugations 73 consisting of alternating longitudinally spaced apart annular ridges and grooves 73A and 73B, respectively, formed in the tubing wall. In FIG. 8, housing 71 has a "relaxed" length corresponding to the minimum actuated length of the wafer stack.

Housing 71 is slipped over actuator stack 64, and collars 72 of the housing bonded to end caps 69 of the actuator stack. Groove 70 in the periphery of end cap 69 facilitates the bonding process.

13. Electrical Connection to Stack a. Connector Details.

Figure 9A:
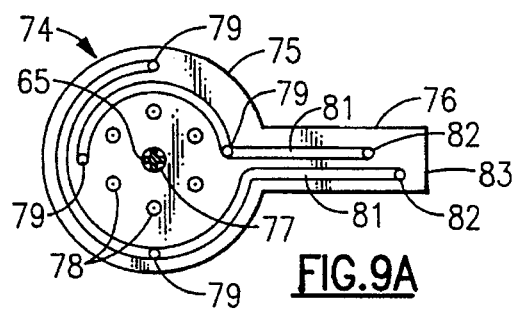
FIG. 9A is a lower plan view of a connector base used to connect to the wafer stack shown in FIG. 5.
Figure 9B:
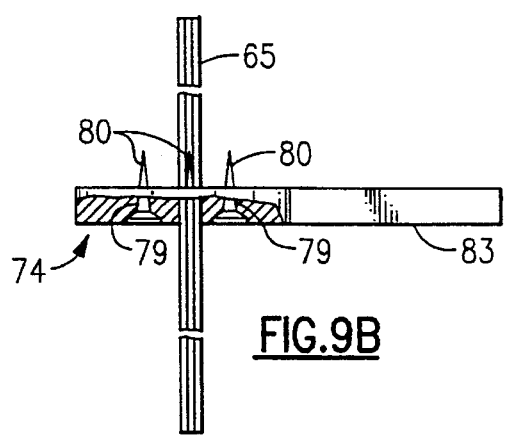
FIG. 9B is a side elevation view of the connector base of FIG. 9A.

Referring to FIGS. 9A and 9B, stack 64 includes a connector base 74 provided with a central hole 77 adapted to loosely receive stack aligning, centering/actuator rod 65. Base 74 is of generally uniform thickness, and has a disk-shaped portion 75 and a radially outwardly protruding arm or mounting tab 76, giving the base in plan view the shape of a banjo. Base 74 is preferably fabricated as a punched printed circuit board, with two sets of holes. One set of holes 78 through base 74 permits the free flow of liquid dielectric through them.

Four through-holes 79 plated with conductive material are provided through disk 75, at 90-degree displaced locations near the perimeter of the disk. Each of the four holes 79 is adapted to receive a needle 80, which is in turn adapted to make electrically conductive contact with a rod 66. Each pair of diametrically opposed needles 80 is connected via a separate conductive strip 81 on the lower surface of base 74 to a separate metal eyelet 82 on lower surface 83 of mounting tab 76. Eyelets 81 are adapted to connect the wafer stack electrically with flexible leads to remote servo control circuits.

Needles 80 have heads on one end resembling flat head rivets, the other ends sharpened. They are pressed into plated through-holes 79 of connector base 74.

14. Mounting Connector to Stack

Figure 10:
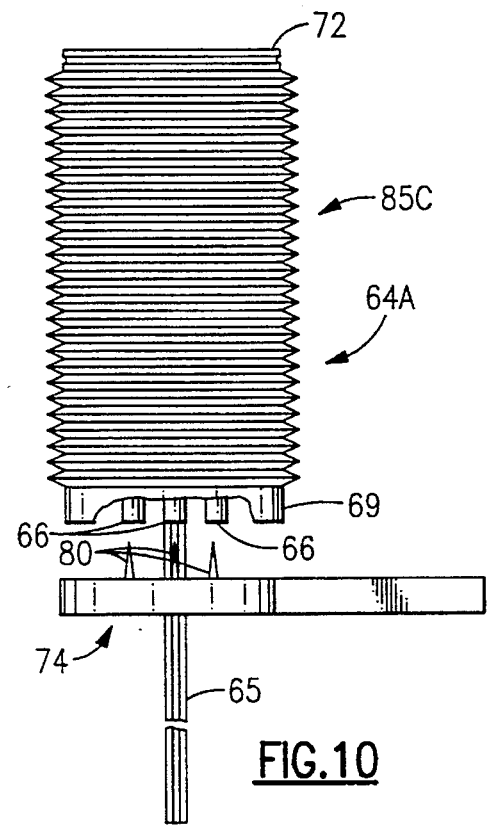
FIG. 10 is a side elevation view showing a blind wafer stack being coupled to the connector base of FIGS. 9A and 9B.

FIG. 10 shows a stack connector base 74 rotationally and axially aligned with the end cap 69 of a blind wafer stack 64A. When stack connector base 74 and end cap 69 are pressed together and bonded via any convenient means, such as with an adhesive, the loosely fitting, fluted centering rod 65 passes through wafers 52 of the stack; and the four needles 80 pierce the ends of the four corresponding conductive elastomer rods 66 of the stack.

In a similar manner, electrical connections to the coupling stack 64B, FIG. 11, are made.

15. Combining Two Stacks to Make One Actuator

Referring to FIG. 11, a blind stack 64A with centering/actuator rod 65 protruding from the bottom end thereof, is joined to a coupling stack 64B, such that their stack connector bases 74 abut. A thin insulating sheet 84 is placed between lower surfaces 83 of connector bases 74, and bonded to the bases.

Centering/actuator rod 65 of blind stack 64A protrudes through both stack 64A and 64B of actuator 85. Two stacks 64A and 64B assembled as described comprise an actuator 85.

16. Filling the Actuator With Dielectric a. Setting Up for Filling.

FIG. 12 shows an actuator 85, the end caps 69A and 69B which are held and clamped at a longitudinal separation of 18.2 mm. Elastomer collars 86 and 87 mate with and provide sealing to end cap 69A of blind stack 64A and end cap 69B of coupling stack 64B, respectively. Bottom collar and seal 87 is then temporarily connected by a fill tube 88, to a container of liquid dielectric. Upper collar and seal 86 is fitted to a length of transparent vacuum tubing 89 and thence to a source of a partial vacuum. Liquid dielectric is then drawn upward by operation of the vacuum source to fill the interior volumes of both stacks 64A and 64B, and rises into transparent vacuum tubing 89. During this step, vibrating means are used to shake the stacks, to help release any air bubbles which may be trapped within the interior of the stacks.

17. Sealing Actuator Ends

When bubbles no longer appear, upper collar and seal 86 is removed. The cavity in blind end cap 69A is filled with liquid dielectric, covered and sealed (bubble free) with a concentrically corrugated elastomer lid 90, as shown in FIG. 13.

Next, actuator 85 is inverted. Collar and seal 87 is then removed, while end caps 69A and 69B are still held at a longitudinally spacing of 18.2 mm. Centering/actuator rod 65 is then bonded to end cap 69B at the location indicated generally by the numeral 91, as shown in FIG. 12.

The cavity in coupling end cap 69B is then filled with liquid dielectric, and sealed with an end cap 92, as shown in FIG. 13. Preferably, a concentrically corrugated elastomer lid or diaphragm 92 is used to enclose and seal (bubble free) centering/actuating rod 65 and end cap 69B. As shown in FIG. 3A, the corrugations 92A in diaphragm 92 permit the center portion of lid 92 to move axially with respect to the rim of the lid, while maintaining a liquid-tight bond between the annular inner wall 92C of a central coaxial hole 92B provided to receive centering rod 65.

18. Finishing the Actuator

Clamps (not shown) used to hold actuator 85 are then released, to prepare the actuator for further assembly and testing steps.

FIG. 13 shows a finished actuator 85 of the example pick-up. The design and dimensions of centering/actuator rod 65 are determined by the geometry of the pick-up in which the actuators are used. For the example pick-up design which follows, cruciform actuator rod 65 is cut short, and a fine coupling wire 93 is fixed in hole 67 that extends axially through the rod.

19. Summary of Actuator Operation

Referring to FIGS. 5 and 6, to energize actuator 85, one terminal of a voltage source is connected to a pair of diametrically opposed conductive spacer rods, such as 66-1 and 66-3. The other terminal of the voltage source is connected to the other pair of diametrically opposed conductive spacer rods, i.e., rods 66-2 and 66-4 in this example. This arrangement results in a potential difference existing between each pair of adjacent wafers 52, such as wafers 52A and 52B. The attractive force caused by the potential difference causes the even number wafers 52B to move axially relatively towards the odd number wafers 52A, compressing elastic spacer rods 66 attached to the wafers. This motion causes housing 71 of a stack 64 to contract, and actuator rod 65 to be extended axially outward from the housing. Thus, referring again to FIG. 13, if blind stack 64A is electrically energized, actuator rod 65 moves outward, and may be used to exert a pushing force. When coupling stack 64B is actuated, that stack is contracted, retracting actuator rod 65, which may be then used to exert a pulling force.

As shown in FIG. 13, when actuator 85 is held rigidly by mounting tabs 76A and 76B, actuator rod 65 is free to move longitudinally ±0.75 mm, plus a margin for tolerances.

As is explained further on, the actuator is dynamically centered dimensionally in its operating range.

For certain applications it may be desirable to have a modification of the novel electrostatic actuator according to the present invention, which has a simplified construction having a push-only force actuating capability, rather than push-pull capability of actuator 85 shown in FIG. 13 and described above. Thus, referring to FIG. 10, a concentrically corrugated lid or diaphragm 92 of the type shown in FIG. 13A and described above may be attached coaxially to lower surface 83 of stack connector base 74 and centering/actuator rod 65, by means of fluid-tight bonds, thus forming an uni-directional force actuator 85-C. Then, when an electrostatic potential difference is applied across capacitive cells 63 of blind wafer stack 64A, actuator housing 71 contracts. Therefore, since the inner end of centering/actuator rod 65 is fixed to an upper lid 92 sealed to upper end cap 69A, contraction of housing 71 causes centering/actuator rod 65 to extend outwards from stack connector base 74.

As was described above, the concentric corrugations in lid 92 permit centering/actuator rod 65 to move axially with respect to connector base 74, while the outer rim and inner central hole wall of the lid remain in fluid-tight connection with the base and centering rod, respectively.

If desired, spring bias means may be used to retract centering actuator rod 65 when the electrostatic contraction force is removed from upper actuator 85-C.

20. Design of Optical Capsule

As shown in FIG. 14, optical module or capsule 94 of the example embodiment comprises an objective lens 95 or its equivalent, and two or more single-mode optical fibers 96 connected to remote optoelectronic and servo circuits 97.

The optical axis of objective lens 95, which preferably is a molded, aspheric objective lens with a numerical aperture (NA) in a typical range of about 0.5 to 0.6, is normal to the outer surface 98 of video disk 99, and focussed upon the information-bearing surface 100 of the disk.

21. Design of Pick-up

FIG. 15A is an end view of one embodiment of a pick-up apparatus 101, according to the present invention, using two low-mass, fast-response actuators 85, positioned relative to a video disk 99, its outer surface 98 and its information bearing surface 100.

In the pick-up apparatus 101, shown in FIG. 15A, the longitudinal axes of a pair of push-pull actuators 85-1 and 85-2, which coincide with their nominal lines of action, are inclined at equal angles to a perpendicular normal to information bearing surface 100, and lie in a vertical plane perpendicular to information containing tracks on disk 99. As will be made clear below, this arrangement provides a two-axis deflection capability for pick-up apparatus 101, namely in a vertical, focus direction and a radial, tracking direction.

The orientation of the end view of FIG. 15A is of a cross section of the disk and tangential with respect to the spiral information tracks 102 of the disk, as shown in FIG. 15B. Optics bearing capsule 94 is suspended at a distance from and normal to the surface 100, by bonding means to coupling wires 93 which protrude from centering/actuator rods 65 of actuators 85, and which also provide lateral support. The projections of the axes of flexible coupling wires 93 coincide at the center of mass 110 of optical capsule 94. As was described previously, coupling wires 93 are, in turn, each coupled coaxially to an actuator 85, through hole 67 in the centering/actuator rod 65 already provided. Actuators 85 are held rigidly by external means at angles of 45° relative to the information bearing surface 100. Coupling wires 93 are preferably short segments of fine piano wire, stiff longitudinally but compliant in bending. They may be attached to housing tube 103 of optical capsule 94 by spot welding or other suitable means.

FIG. 16 is an end view of the pick-up apparatus 101 of FIG. 15. The orientation of the view is of a cross section of a video disk along a radius. Mounting tab 76 of the nearer actuator 85-1 of the two actuators, the farther actuator 85-2 being hidden, is held rigidly by external transport means not shown. Two pairs of electrical wires 104-1 connect actuator 85-1 to remote servo control electronics 97. An identical set of wires 104-2 connects the farther actuator, not shown, to electronics assembly 97. The preferred embodiment includes tabs provided on the edges of printed circuit boards, which may be connected to the pick-up mounting means by a simple connector.

As shown in FIG. 16, optical fibers 96 extend from optical capsule 94 to remote optoelectronics 97. The optical fibers are held straight by a drag link, not shown, which is described below.

22. Drag Link System

Referring to FIGS. 17A and 17B, a drag link assembly 105 is used to provide the following functions: (A) Stabilize the position of the optical capsule 94, in the plane parallel to the information bearing surface of a video disk, in the direction tangential to the optical spiral path, or tracks of the disk, (B) Reduce torsional motions in both axes about the centroid of the optical capsule, (C) Support optical coupling fibers 96 in a straight and flat manner from the optical capsule to the remote optoelectronics, and (D) Reduce the effects of the gravitational orientation of the video disk system. Drag link 105 is bonded to the optical capsule 94 and torsionally hinged to the appropriate portion 106 of the transport, not shown, preferably by means of a torsional wire 108.

23. Drag Link Design

Drag link 105 is preferably made of a structural, closed cell foam, and is constructed to exactly balance the mass of optical capsule 94, by means of a counterweight 109, with no torque on hinge wire 108. Any residual forces on optical capsule 94, caused by actuators 85, are compensated for by other means.

24. Drag Link Dimension

The length of drag link 105 between torsional hinge 108 and optical capsule 94 is determined by the angle of tilt of the optical axis of the capsule from the normal which may be tolerated:

$$L = \frac{1}{2}(1.5\sqrt{2})/\sin \alpha$$

where

L=Length 1.5 mm=normal peak/peak actuator travel

±α=tolerated tilt angle

Transport Considerations

The function of the transport supporting a pick-up apparatus is to convey the low mass, fast response pick-up of the present invention, on a time-integrated, error averaging basis.

The low mass of the novel pick-up apparatus according to the present invention reduces the stress on the transport during perturbations. Therefore, the transport may be smaller and lighter than those presently used. For example, a transport made primarily of structural foam materials, instead of heavier materials, may be usable with the novel pick-up according to the present invention.

25. Performance Characteristics of Pick-Up a. Longitudinal Travel of Pick-Up at 45°

Referring to FIGS. 15A and 18, each actuator 85 of pick-up apparatus 101 provides continuously controlled travel through its centering/actuator rod 65 linked by compliant wire 93 to the center of mass 110 of optical capsule 94 of 1.5 mm peak-to-peak amplitude.

b. Arc Travel of Pick-Up

Referring to FIG. 19, operation of actuator 85-1 will be influenced by the action of the actuator 85-2 whose coupling wire 93-2 is shown joined to the center of mass 110 of optical capsule 94. If, for example, the actuator 85-2 contracts lengthwise to its limit, ½(1.5) mm, the centerline of actuator 85-1 will be drawn counterclockwise along an arc of equal length. And if actuator 85-1 is also contracted to its limit, then the axis of centering/actuator rods shift by an angle:

$$a = \pm\arctan \frac{1}{2}[(1.5)/(9.1+5.0-0.75)] = \pm 3°$$

This angle is accommodated by the loose fit of centering/ actuator rods 65 within the bores of actuators 85-1 and 85-2.

c. Performance Envelope of Pick-Up

Referring to FIG. 20, when both actuators of the pick-up are fully contracted, point A is established. Similarly when both actuators are fully extended, point B is established. The axis AB, the length of which is $1.5 \sqrt{2} = 2.1$ mm, represents the limits of focus correction attainable by the pick-up, without tracking correction.

When one actuator is fully contracted and the other fully extended, and vice versa, the axis CD represents the limits of tracking correction attainable with pick-up apparatus 101. The length of axis CD is also $1.5 \sqrt{2} = 2.1$ mm. At a track pitch of 1.6 μm, this is equivalent to over 1,300 tracks. In FIG. 20, circle 111 of diameter D=1.5 mm, equivalent to more than 900 tracks, defines the limit of any combination of focus and tracking corrections achievable with the example embodiment or pick-up apparatus 101.

At a disk rotation rate of 1,800 RPM, a tracking maintenance range of 900 tracks represents one-half minute of playing time; for a rotation rate of 80 RPM, the maintenance time would be approximately 11 minutes.

d. Worst Case Example Of Pick-Up Performance

In FIG. 20A, the center 112 of the 1.5 mm-diameter circular performance envelope 111 lies on the information bearing surface 100 of the video disk 99. By closed loop servo means, center 112 is maintained at the correct point on surface 100 for focusing and tracking. For small vibrations or other such perturbations of the video disk system, very low control voltages on actuators 85 of pick-up apparatus 101 are required to maintain the desired position of tracking point 112, since the accelerations are relatively small.

But, in a more severe case (FIG. 20B), a shock of some 100 G's, (100 times gravity) may be imposed upon the video disk system, causing the pick-up transport mechanism (not shown) to be displaced from its initial quiescent position 112 relative to the video disk, at the same rate, and, for example, at the 45° angle shown. Without very rapid response of the pick-up, or if the pick-up were not in closed-loop control, the focal point of the pick-up would be displaced to point 112-1, the center of the phantom circle 111-1, and both focussing and tracking would be lost.

If the transport positional deviation does not exceed ½ (1.5) mm, at up to 100 G's of acceleration, the performance envelope or pick-up apparatus 101 will not be exceeded. Then, because of the extremely low relative mass of the pick-up, the focal point, determined by the servo controlled pick-up will maintain continuous focusing and tracking of information bearing tracks on the video disk.

26. Three-Axis Pick-Up

Figure 21:
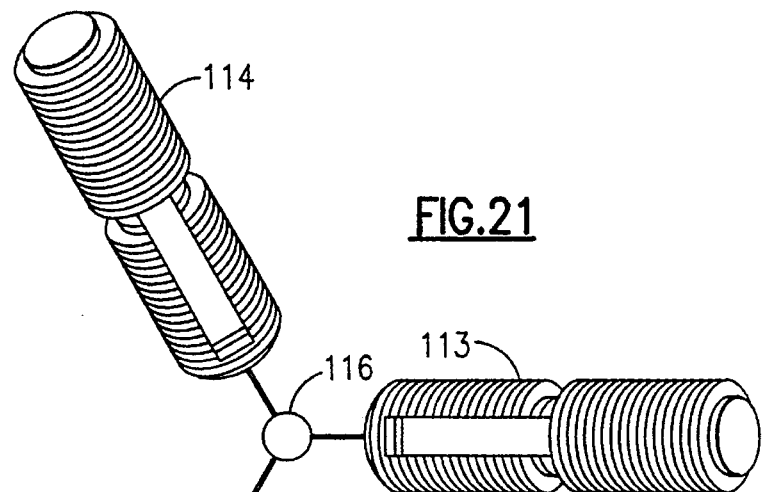
FIG. 21 is a fragmentary upper plan view of another embodiment of a pick-up apparatus according to the present invention, in which three actuators are used to deflect the pick-up in three axes.
Figure 23:
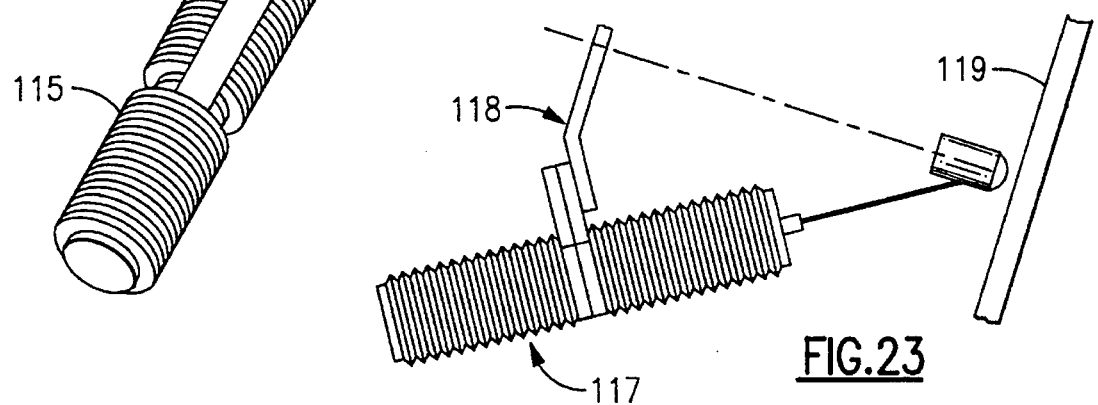
FIG. 23 is a fragmentary elevation view of the apparatus of FIG. 21, showing how an actuator is attached to a transport mechanism.

The pick-up apparatus 101 compensates for shocks in the radial or x axis and in the normal or z axis, corresponding to tracking and focusing, respectively. If, in addition, shock compensation in the tangential or y axis is to be incorporated in the pick-up, one method is to place within the drag link 105 a third actuator having a line of action parallel to the longitudinal axis of the drag link, as shown in FIG. 17B. Preferably, however, a modified embodiment 121 of the present invention, shown in FIGS. 21–23 would be used to achieve a three-axis deflection capability. As shown in FIG. 21, three-axis pick-up apparatus 121 includes three transducers 122-A, 122-B and 122-C held rigidly 120° apart by a transport (not shown) and connected together centrally to an optical capsule 122 by means of stiff wires 124A, 124B, and 124C. As shown in FIG. 23, each transducer 122 is held rigidly by its mounting tab 76, bonded to an arm 125 of a transport mechanism, not shown, at an angle of 45° with respect to the information-bearing layer of the video disk 119.

Figure 22:
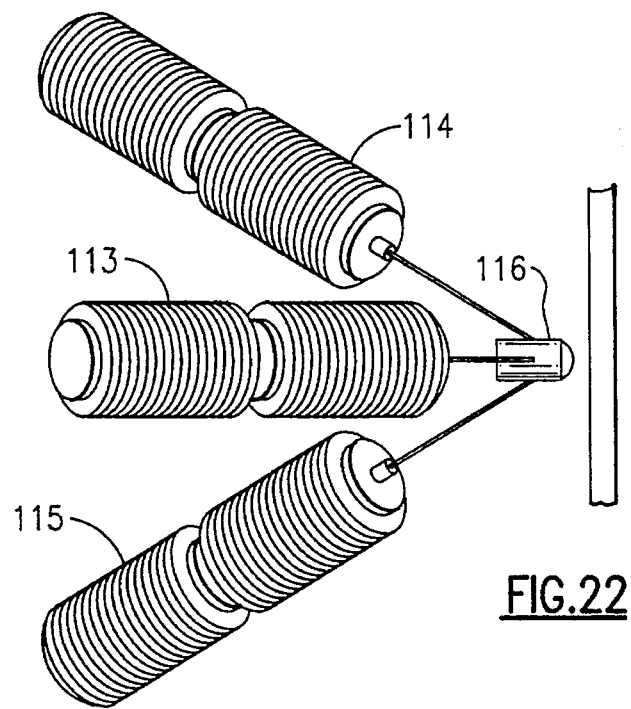
FIG. 22 is a fragmentary elevation view of the apparatus of FIG. 21.

The three-dimensional geometric relationship of the all-axis pick-up 121 is further clarified by FIG. 22.

By combining the x-z capabilities of the two-axis, two-transducer pick-up, the shock compensation illustrated by FIG. 20B as a circular plane normal to and centered on the information bearing layer of the video disk is converted to shock compensation envelope described by a sphere identically located.

Time base errors, arising from perturbations in the rotational speed of a video disk, may be corrected along the y axis during normal play be means of the three-axis pick-up.

It should be noted that the novel actuator configurations used in pick-up apparatus 101 and pick-up apparatus 121, described above could use other types of electrostrictive or magnetostrictive linear actuators.

What is claimed is:

1. A linear actuator for producing a linearly directed force in response to an electrical signal comprising:
    an elongated flexible housing adapted to contain a dielectric material;
    a plurality of stacked capacitive actuator cells disposed at longitudinally spaced apart locations within said housing, each of said cells comprising a pair of thin parallel, transversely disposed electrodes having a dielectric fluid therebetween, and means for supporting said electrodes in parallel relationship while permitting relative axial motion therebetween, wherein said electrodes are provided with perforations through a thickness dimension thereof, thereby providing paths for said dielectric fluid to flow through said electrodes;
    means for conducting an electrical charge to said electrodes and thereby producing an axially directed electrostatic force therebetween; and
    means for coupling axial motion of said electrodes with respect to one another to an external force exerting member.

2. The actuator of claim 1 wherein said capacitive actuator cells are further described as being concentrically located with respect to the longitudinal axis of said actuator.

3. The actuator of claim 2 wherein said electrodes of said cells are further defined as having in plan view the shape of a regular polygon having a central coaxial perforation therethrough.

4. The actuator of claim 1 wherein said electrodes are further defined as being circular disks.

5. The actuator of claim 1 wherein said means for coupling axial motion of said electrodes to an external force exerting member comprises in combination;
    a sealed fluid-tight end cap sealing a first transverse end of said housing;
    an elongated actuator rod attached to said sealed end cap, said actuator rod being slidably contained within said central coaxial perforations of said electrodes and extending through said housing; and
    a perforated end cap sealing a second transverse end of said housing, said perforated end cap having a central coaxial perforation for sealingly receiving said actuator rod, while maintaining a fluid-tight joint between the walls of said perforation and said rod, said end cap including means permitting relative axial movement between said rod and the perimeter of said end cap.

6. The actuator of claim 5 wherein said end cap is further defined as being made of a flexible material permitting axial motion between the center and perimeter of said end cap.

7. The actuator of claim 6 wherein said end cap is further defined as having concentrically arranged annular corrugations adapted to increase the ease of axial motion of the center of said end cap relative to its perimeter.

8. The actuator of claim 5 wherein said means for supporting said electrodes in a parallel relationship while permitting relative axial motion therebetween comprises in combination:
    at least one odd-numbered elongated, longitudinally disposed, spacer rod fastened to the first and each odd numbered disc-shaped electrodes;
    at least one even numbered elongated, longitudinally disposed, spacer rod fastened to the second and each even numbered disc-shaped electrodes;
    first aperture means through each even numbered disc-shaped electrode for slidably receiving said odd numbered spacer rod without making electrically conductive contact therewith; and
    second aperture means through each odd numbered disc-shaped electrode for slidably receiving said even numbered spacer rod without making electrically conductive contact therewith.

9. The actuator of claim 8 wherein said spacer rods are further defined as being longitudinally deformable.

10. The actuator of claim 8 wherein said spacer rods are further defined as being resiliently deformable in a longitudinal direction.

11. The actuator of claim 8 wherein said spacer rods are further defined as being elastically deformable in a longitudinally direction.

12. The actuator of claim 8 wherein said spacer rods are further defined as being made of an elastomeric material.

13. The actuator of claim 1 wherein said means for supporting said electrodes in a parallel relationship while permitting relative axial motion therebetween is further defined as comprising in combination:
    a first pair of elongated, longitudinally disposed spacer rods fastened at diametrically opposite locations to the first and each odd numbered disc-shaped electrodes, at least one of said first pair of said spacer rods being electrically conductive and in electrically conductive contact with each of said odd number electrodes; and
    a second pair of elongated, longitudinally disposed spacer rods fastened at diametrically opposed locations to the second and each even numbered disc-shaped electrode, said second pair of rods being displaced circumferentially from said first pair of rods, at least one of said second pair of said spacer rods being electrically conductive and in electrically conductive contact with each of said even number electrodes, and being electrically isolated from said odd electrodes.

14. The linear actuator of claim 1 wherein said means for conducting an electrical charge to said electrodes comprises in combination said conductive spacer rods and electrical terminals in contact therewith adapted to conductively couple to an external voltage source.

15. The linear actuator of claim 1 wherein said elongated flexible housing is further defined as having a generally cylindrical shape.

16. The linear actuator of claim 15 wherein the outer cylindrical wall surface of said housing is further defined as having a longitudinally corrugated structure comprising a plurality of longitudinally spaced apart, radially outwardly projecting annular flanges alternating with radially inwardly projecting constrictions.

17. A linear actuator adapted to exert bi-directional axial forces in response to an electrical signal comprising:
    a first, push actuator stack assembly comprising:
    (i) an elongated, flexible liquid-tight housing adapted to contain a fluid and having a first transverse end cap sealing an end of said housing;
    (ii) a plurality of capacitive actuator cells stacked at longitudinally spaced apart locations within said housing, each of said cells comprising a pair of thin, parallel, transversely disposed electrically conductive wafers having a dielectric fluid therebetween, said wafers being provided with perforations through the thickness dimension thereof and adapted to allow flow of dielectric fluid through said perforations, and means for supporting said wafers in an axially aligned relationship, while permitting relative axial movement between said wafers of said capacitive cells;

(iii) means for conducting an electrical charge to said wafers, thereby producing an axially directed, attractive electrostatic force between adjacent wafers;

(iv) an elongated actuator rod disposed longitudinally through said stack assembly, said actuator rod being fastened at a first end thereof to said first transverse end cap and protruding longitudinally through said stack assembly and the second transverse end of said housing;

(v) a second transverse end cap sealingly connected to the second transverse end of said housing, said second transverse end cap being sealingly joined to said actuator rod protruding therethrough, said second transverse end cap being adapted to permit axial motion of said actuator rod relative to said housing; and a second, pull, actuator stack assembly, said pull actuator stack assembly being substantially mirror symmetric with said first, push, actuator stack assembly, and longitudinally aligned back-to-back therewith, said second actuator assembly having a second transverse end cap joined to said first transverse end cap of said first actuator stack, said actuator rod protruding longitudinally through said second actuator stack assembly and through said first end cap of said second actuator stack and sealingly joined thereto, whereby applying a voltage between adjacent wafers of said first, push actuator stack causes said first actuator stack to contract longitudinally and said actuator rod to extend outwards with respect to the junction between said first and second actuators, and whereby applying a voltage between adjacent wafers of said second, pull actuator stack, causes said second actuator stack to contract longitudinally and said actuator rod end to retract inwards towards said junction between said first and second actuator stacks.

18. The linear actuator of claim 17 wherein in both said first and second actuator stack assemblies, said means for supporting said wafers in an axially aligned relationship while permitting relative axial movement between said wafers comprises in combination:

a first pair of diametrically opposed pinch slots extending radially inwards from diametrically opposed positions of the perimeter of each of said wafers, said pinch slots, and a second pair of diametrically opposed clearance slots of generally rectangular shape extending radially inwards from diametrically opposed positions on the perimeter of each of said wafers, at positions circumferentially spaced apart ninety degrees from said pinch slots, said clearance slots having a greater width than said pinch slots, each capacitive actuator cell consisting of a pair of said slotted wafers oriented at ninety degrees to one another so that said pair of pinch slots in odd numbered wafers is axially aligned with said clearance slots in even numbered wafers;

a first pair of elongated, longitudinally disposed elastic spacer rods fitted tightly into said pinch slots of odd numbered wafers, at least one of said first pair of spacer rods being electrically conductive and in electrically conductive contact with each of said odd numbered wafers, said first pair of spacer rods being axially movable through said clearance slots of said even numbered wafers without making electrical contact therewith; and a second pair of elongated, longitudinally disposed spacer rods fitted tightly into said pinch slots of even numbered wafers, at least one of said second pair of spacer rods being electrically conductive and in electrically conductive contact with each of said even numbered wafers, said second pair of spacer rods being spaced circumferentially apart by ninety degrees from said first pair of spacer rods and being axially movable through said clearance slots of said odd numbered wafers without making electrical contact therewith.

19. The linear actuator of claim 18 wherein said electrically conductive spacer rods of said first and second actuator stack assemblies are further defined as being made of a conductive elastomer.

20. The linear actuator of claim 19 wherein each said housing for said first and second actuator stack assemblies is further defined as being an elongated, generally cylindrically-shaped tube made of a flexible material.

21. The linear actuator of claim 20 wherein the outer cylindrical wall surface of said housing is further defined as having a longitudinally corrugated structure comprising a plurality of longitudinally spaced apart, radially outwardly projecting annular flanges alternately disposed between a plurality of radially inwardly projecting annular constrictions.

* * * * *